(12) United States Patent
Younes

(10) Patent No.: US 11,555,418 B2
(45) Date of Patent: Jan. 17, 2023

(54) OIL SUPPLY SYSTEM FOR A GAS TURBINE ENGINE

(71) Applicant: General Electric Company, Boston, MA (US)

(72) Inventor: Firas Younes, Randolph, MA (US)

(73) Assignee: GENERAL ELECTRIC COMPANY, Boston, MA (US)

(*) Notice: Subject to any disclaimer, the term of this patent is extended or adjusted under 35 U.S.C. 154(b) by 878 days.

(21) Appl. No.: 16/438,838

(22) Filed: Jun. 12, 2019

(65) Prior Publication Data

US 2020/0392866 A1 Dec. 17, 2020

(51) Int. Cl.
*F01D 25/20* (2006.01)
*F16C 19/52* (2006.01)
*F16C 33/66* (2006.01)

(52) U.S. Cl.
CPC .............. *F01D 25/20* (2013.01); *F16C 19/52* (2013.01); *F05D 2220/323* (2013.01); *F05D 2260/98* (2013.01); *F05D 2270/09* (2013.01); *F16C 33/6659* (2013.01)

(58) Field of Classification Search
CPC .............. F01D 25/20; F05D 2220/323; F05D 2260/98; F05D 2260/84; F05D 2270/09; F16N 2210/09; F16N 2260/20; F16C 19/52; F16C 33/6659
USPC .......................................... 184/6.11
See application file for complete search history.

(56) References Cited

U.S. PATENT DOCUMENTS

| | | | |
|---|---|---|---|
| 3,779,345 A | 12/1973 | Barnes et al. | |
| 4,002,224 A * | 1/1977 | Easter | F01D 25/20 60/39.08 |
| 4,972,671 A | 11/1990 | Asselin et al. | |
| 4,976,335 A * | 12/1990 | Cappellato | F16N 29/02 184/7.4 |
| 7,387,189 B2 * | 6/2008 | James | F01D 21/14 184/6.11 |
| 8,230,835 B2 | 7/2012 | Gibson et al. | |
| 8,800,720 B2 | 8/2014 | Motto | |
| 9,410,448 B2 | 8/2016 | Sheridan et al. | |
| 9,765,643 B2 | 9/2017 | Stutz et al. | |
| 2014/0124297 A1 * | 5/2014 | Motto | F01D 25/20 184/6.12 |
| 2016/0032772 A1 * | 2/2016 | Sheridan | F01D 15/12 416/171 |
| 2016/0245117 A1 | 8/2016 | Parnin et al. | |
| 2016/0305284 A1 * | 10/2016 | Mastro | F01D 25/20 |
| 2017/0138217 A1 * | 5/2017 | Schwarz | F02C 3/10 |
| 2020/0340375 A1 * | 10/2020 | Dupays | F01M 11/12 |

* cited by examiner

*Primary Examiner* — Michael R Mansen
*Assistant Examiner* — Mark K Buse
(74) *Attorney, Agent, or Firm* — Venable LLP; Michele V. Frank

(57) ABSTRACT

An oil supply system and a method for operating the same to provide oil to a gas turbine engine in a variety of harsh operating conditions is provided. The oil supply system includes a main oil tank and an auxiliary oil tank which share oil through a tank sharing valve that may be closed if a depressurization event occurs in the main oil tank. The oil supply system further includes an auxiliary supply conduit and an auxiliary oil pump for providing oil to the gas turbine engine in the event of main oil tank depressurization or in negative gravity conditions where the oil within the auxiliary oil tank rises to the top of the tank and uncovers the oil pump supply.

19 Claims, 6 Drawing Sheets

OIL SUPPLY SYSTEM FOR A GAS TURBINE ENGINE

FEDERAL RESEARCH STATEMENT

This invention was made with Government support under Contract No. W58RGZ-16-C-0047, awarded by the U.S. Army Contracting Command—Redstone. The Government has certain rights in the invention.

FIELD

The present subject matter relates generally to lubrication systems for engines. More particularly, the present subject matter relates to an oil supply system for lubricating a gas turbine engine in a variety of operating conditions.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Gas turbine engines commonly include various components or subsystems which include moving parts that require frequent or constant lubrication, e.g., via an oil supply. For example, in a particular configuration, the turbine section is mechanically coupled to the compressor section by one or more shafts extending along an axial direction of the gas turbine engine. In addition, a power gear box may be provided to mechanically couple the fan to one of the shafts, e.g., for rotating the fan at a lower speed than the shaft.

To provide such lubrication, gas turbine engines typically include a lubrication system for providing lubricant to one or more portions of the gas turbine engine, such as the compressor and turbine sections of the core and the power gear box. However, typical lubrication systems provide oil from a single tank. Notably, if operating conditions prevent oil from being supplied from the single tank to sensitive engine components, severe part degradation and even engine failure may occur. Thus, for example, when gas turbine engines are used in a military application where potential punctures or depressurizing events of the oil tank are possible, or where negative gravity conditions are relatively common, conventional lubrication systems are often inadequate.

Accordingly, a gas turbine engine with an improved oil supply system would be useful. More specifically, an oil supply system that maintains oil supply to critical portions of a gas turbine engine in even the harshest operating conditions would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, an oil supply system for a gas turbine engine is provided. The oil supply system includes a main oil tank for receiving oil, an auxiliary oil tank, and a tank sharing valve fluidly coupling the main oil tank and the auxiliary oil tank, the tank sharing valve being movable to a closed position to prevent the oil from flowing from the auxiliary oil tank to the main oil tank. An auxiliary supply conduit provides fluid communication between the auxiliary oil tank and the gas turbine engine and an auxiliary oil pump is fluidly coupled to the auxiliary supply conduit for providing a flow of auxiliary oil to the gas turbine engine.

In another exemplary embodiment of the present disclosure, a method of supplying oil to a gas turbine engine using an oil supply system is provided. The oil supply system includes a main oil tank and an auxiliary oil tank fluidly coupled by a tank sharing conduit, a primary supply conduit fluidly coupling both the main oil tank and the auxiliary oil tank to the gas turbine engine, and an auxiliary supply conduit fluidly coupling the auxiliary oil tank to the gas turbine engine. The method includes providing the oil to the gas turbine engine through both the primary supply conduit and the auxiliary supply conduit, detecting a depressurization event in the main oil tank, stopping a flow of shared oil through the tank sharing conduit in response to detecting the depressurization event, isolating the main oil tank from the primary supply conduit in response to detecting the depressurization event, and operating an auxiliary oil pump to urge a flow of auxiliary oil through the auxiliary supply conduit to the gas turbine engine in response to detecting the depressurization event.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
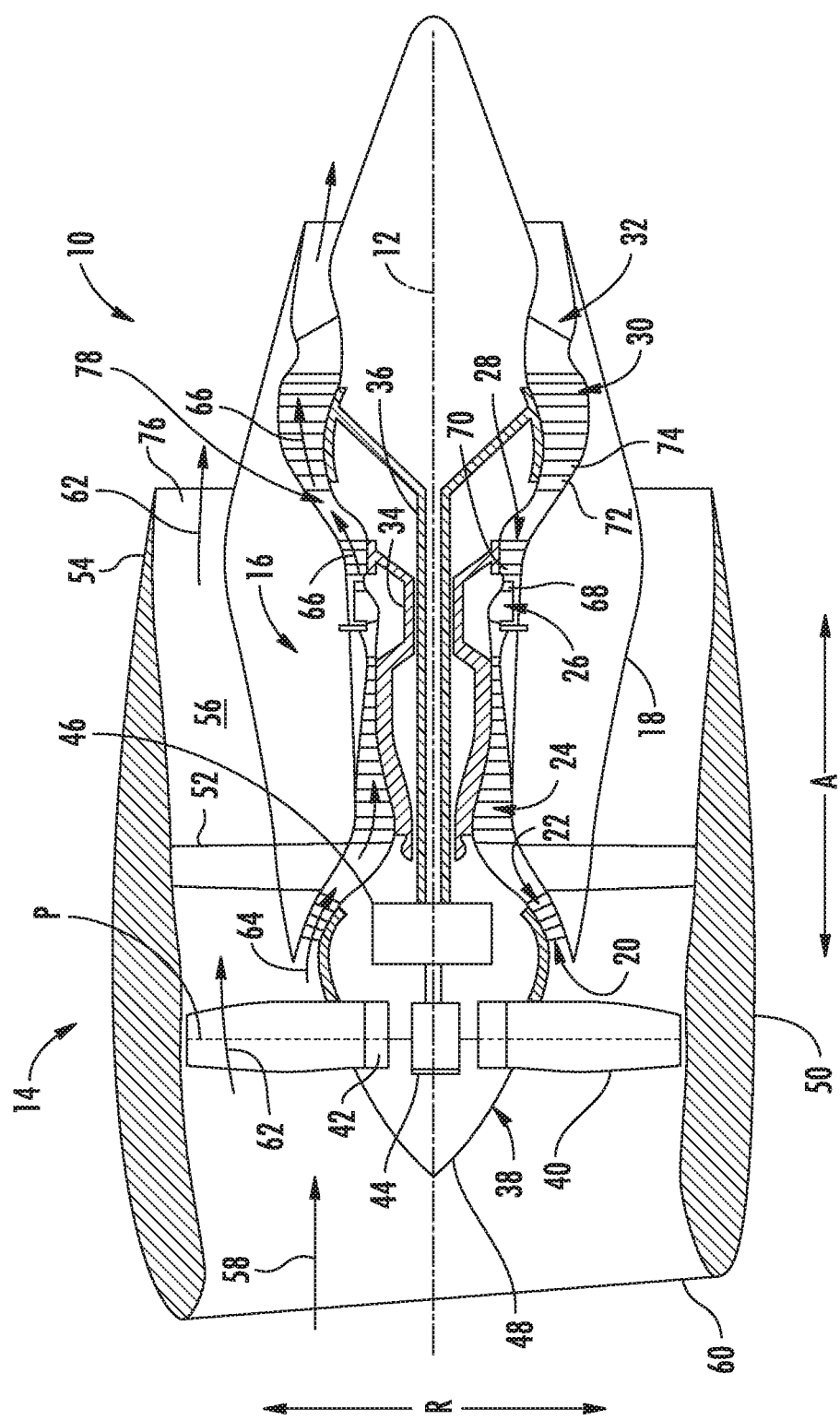
FIG. 1 provides a schematic cross-sectional view of an exemplary gas turbine engine according to various exemplary embodiments of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. In addition, terms of approximation, such as "approximately," "substantially," or "about," refer to being within a ten percent margin of error.

Aspects of the present disclosure are directed to an oil supply system and a method for operating the same to provide oil to a gas turbine engine in a variety of harsh operating conditions. The oil supply system includes a main oil tank and an auxiliary oil tank which share oil through a tank sharing valve that may be closed if a depressurization event occurs in the main oil tank. The oil supply system further includes an auxiliary supply conduit and an auxiliary oil pump for providing oil to the gas turbine engine in the event of main oil tank depressurization or in negative gravity conditions where the oil within the auxiliary oil tank rises to the top of the tank.

FIG. 1 provides a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration and the present subject matter may be applicable to other types of turbomachinery. For example, in other exemplary embodiments, the turbofan engine 10 may instead be configured as, e.g., a direct-drive turbofan engine, a fixed-pitch turbofan engine, etc. Additionally, or alternatively, the turbofan engine 10 may be configured as a turboprop engine, a turbojet engine, a turboshaft engine, a ramjet engine, an auxiliary power unit engine, etc. Additionally, or alternatively, still, in other embodiments the turbofan engine 10 of FIG. 1 may instead be configured as an aeroderivative gas turbine engine, e.g., for nautical uses, or as an industrial gas turbine engine, e.g., for power generation.

Figure 2:
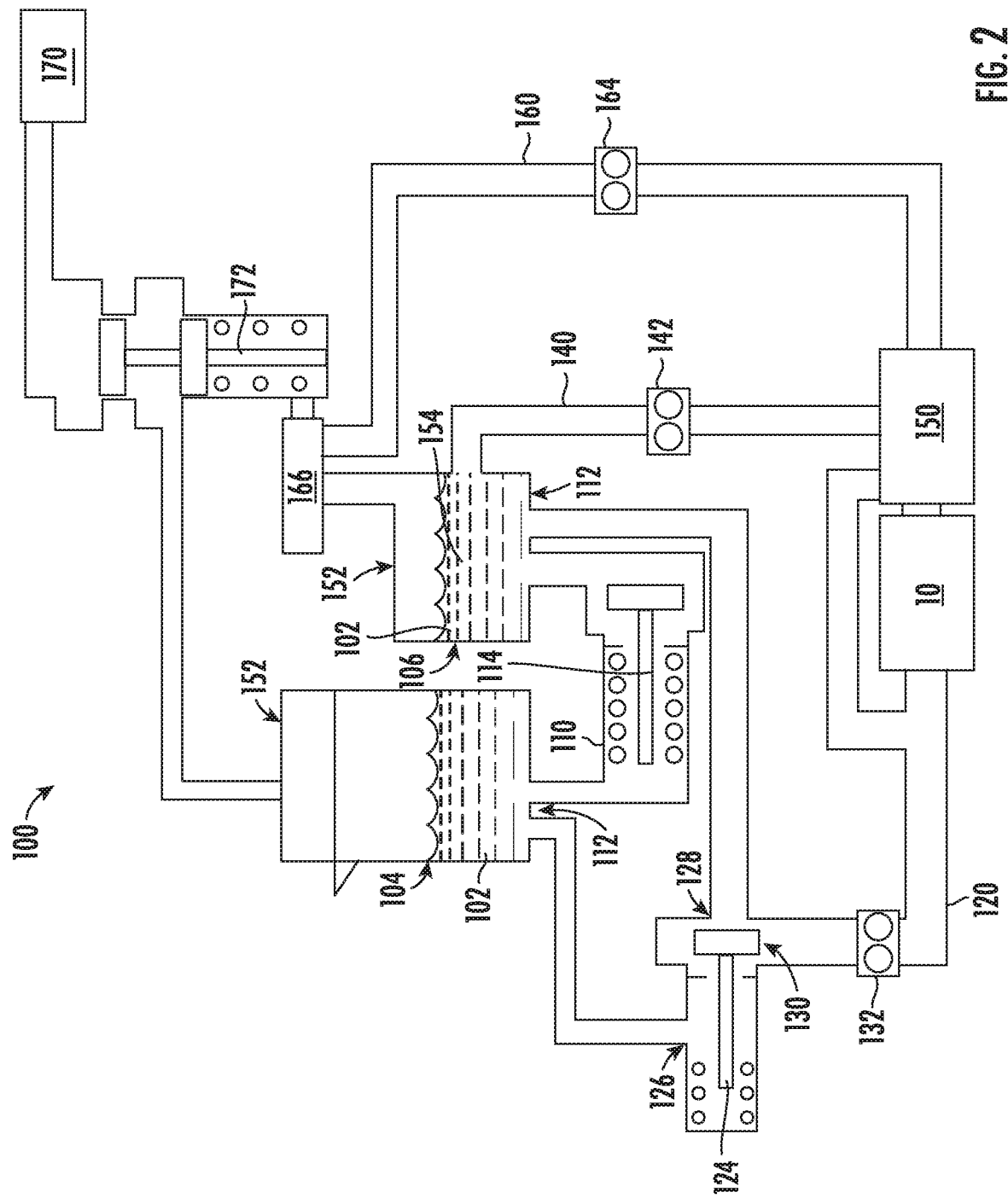
FIG. 2 provides a schematic view of an oil supply system that may be used with the exemplary gas turbine engine of FIG. 1.

Referring now to FIG. 2, a schematic view of an oil supply system 100 according to an exemplary embodiment of the present subject matter is provided. In general, oil supply system 100 may be used for lubricating or oiling gas turbine engine 10 during operation, or may be used to supply oil to any other suitable system or machinery in similar or related operating conditions. In this regard, although oil supply system 100 is described herein as being used for providing oil to gas turbine engine 10, it should be appreciated that aspects of oil supply system 100 may be used to oil or lubricate other systems while remaining within the scope of the present subject matter.

Figure 3:
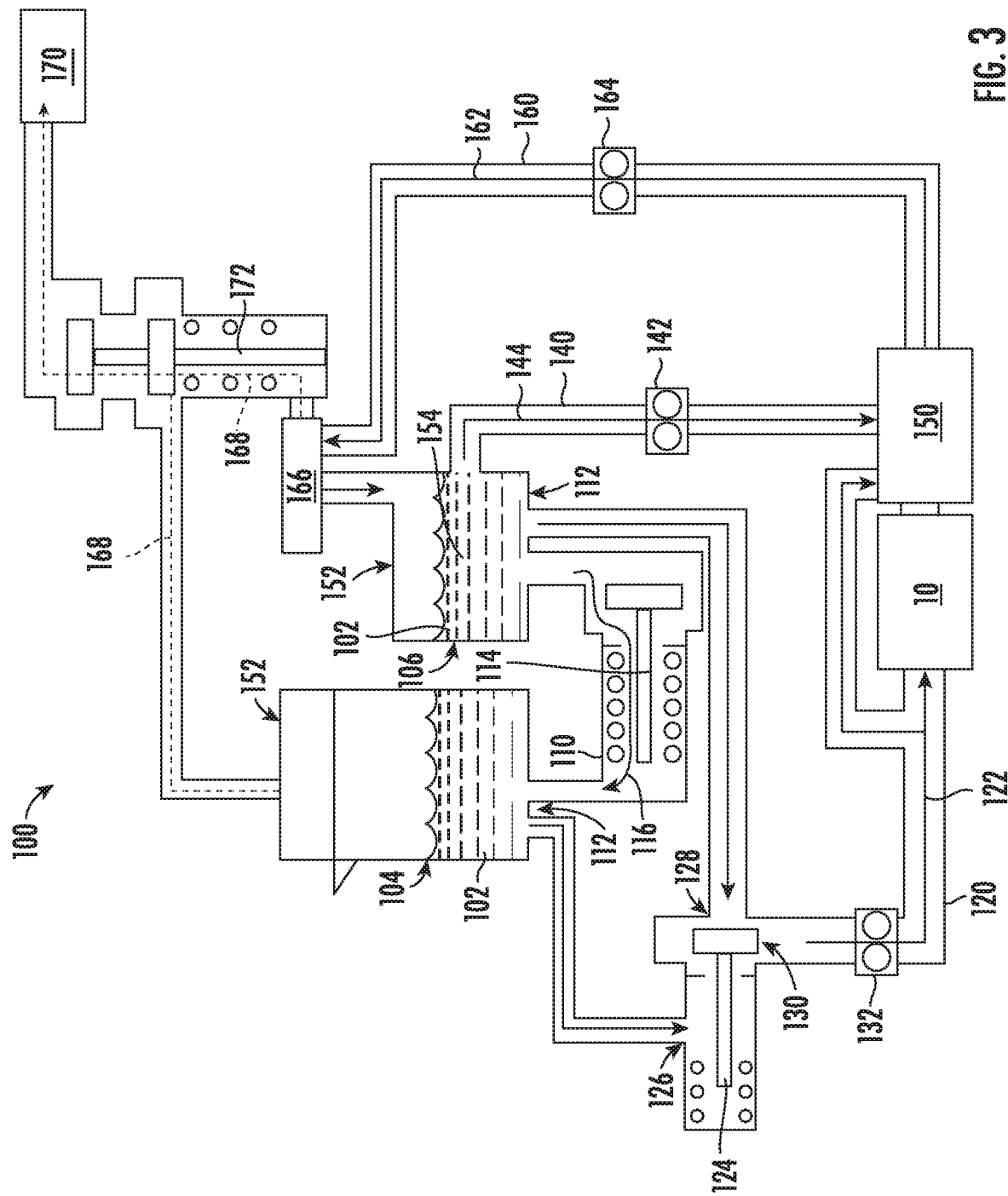
FIG. 3 provides a schematic view of the exemplary oil supply system of FIG. 2 in a normal mode of operation.
Figure 4:
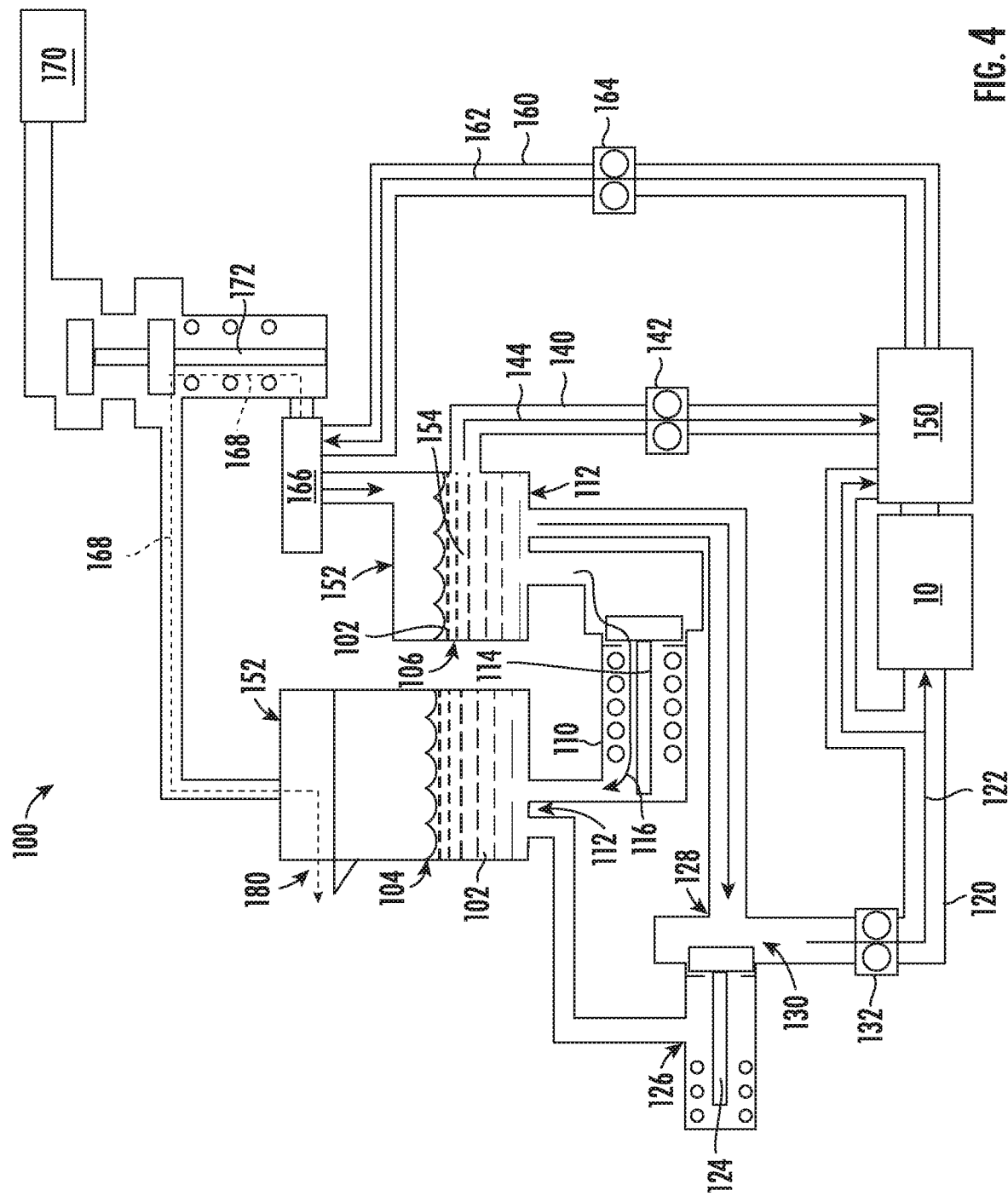
FIG. 4 provides a schematic view of the exemplary oil supply system of FIG. 2 when a depressurization event occurs in a main oil tank.
Figure 5:
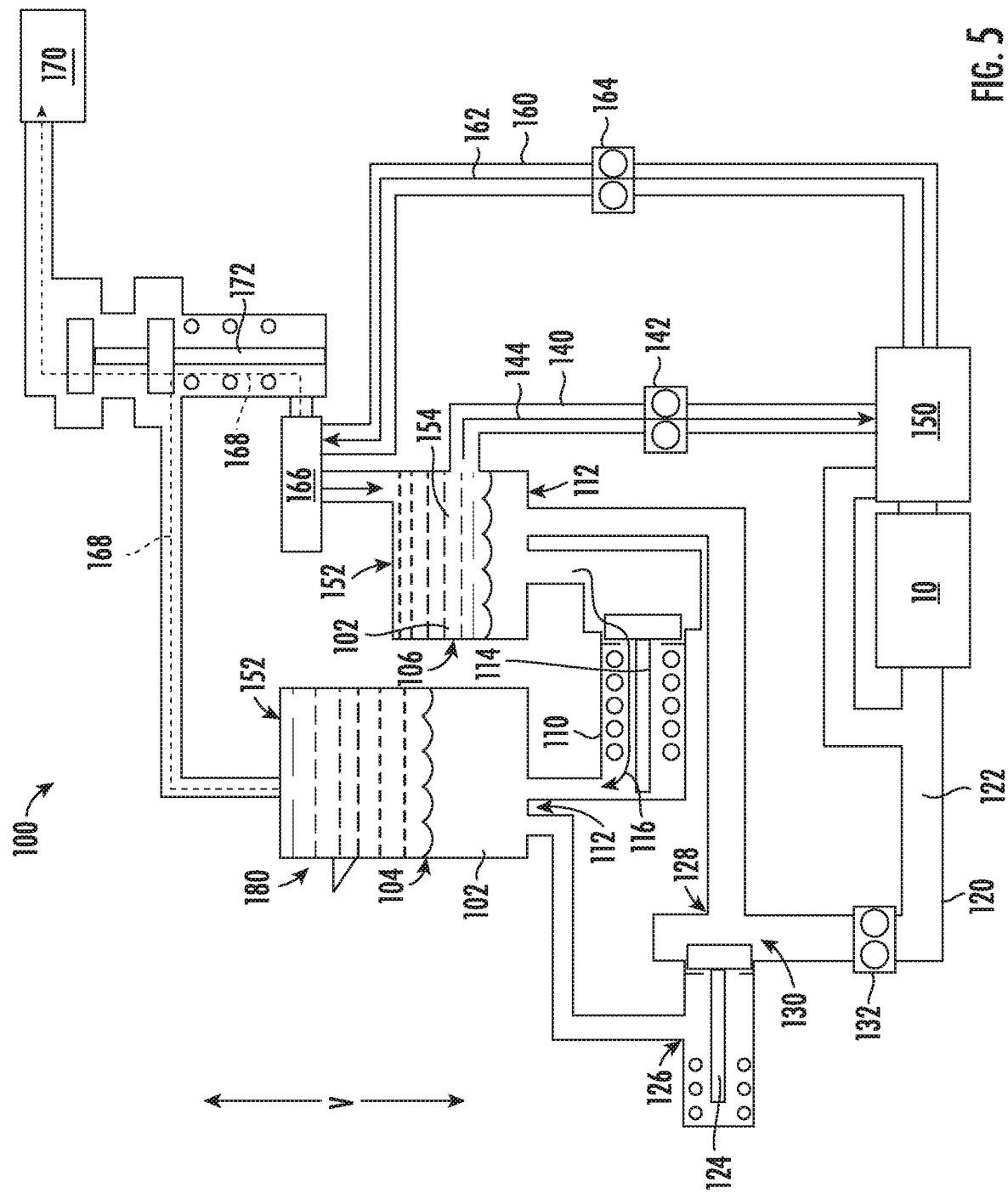
FIG. 5 provides a schematic view of the exemplary oil supply system of FIG. 2 when in a negative gravity mode of operation.

As illustrated and described herein, oil supply system 100 includes a variety of components, conduits, valves, and oil storage tanks for facilitating the flow of oil to gas turbine engine 10 under a variety of operating conditions. For example, FIG. 2 illustrates schematically the components of oil supply system 100 in a shutdown or non-operational position, FIG. 3 illustrates the operation of oil supply system 100 in a normal mode of operation, FIG. 4 illustrates the operation of oil supply system 100 in an emergency or pressure loss mode of operation, and FIG. 5 illustrates the operation of oil supply system 100 in a negative gravity mode of operation. However, it should be appreciated that according to alternative embodiments, oil supply system 100 may include additional or alternative supply conduits, valves, and other components for facilitating additional modes of operation, for providing additional supply system redundancies, or to otherwise alter the means by which oil is supplied to gas turbine engine 10.

Moreover, although oil supply system 100 is described herein as providing oil 102 to gas turbine engine 10, it should be appreciated that according to alternative embodiments, oil supply system 100 may be used to provide any suitable type of fluid to any other system of components or machines for any other purpose. For example, oil supply system 100 may provide grease, oil, lubricating fluid, coolants, hydraulic fluids, pneumatic fluids, or any other suitable working fluid to any suitable machine, device, or system. Thus, it should be appreciated that variations and modifications may be made to oil supply system 100 while remaining within the scope of the present subject matter.

Referring now specifically to FIG. 2, oil supply system 100 includes a main oil tank 104 and an auxiliary oil tank 106 that each generally define reservoirs for receiving oil 102 for lubricating gas turbine engine 10. Specifically, as illustrated, main oil tank 104 and auxiliary oil tank 106 are separate tanks that are spaced apart from each other in gas turbine engine 10. In this manner, as will be described in more detail below, if main oil tank 104 experiences a pressure loss event, for example, due to artillery fire, auxiliary oil tank 106 may be shielded from such artillery fire and may supply oil to all or part of gas turbine engine 10.

Although main oil tank 104 and auxiliary oil tank 106 are illustrated as being separate tanks for storing oil 102, it should be appreciated that according to alternative embodiments, main oil tank 104 and auxiliary oil tank 106 may instead be positioned adjacent each other and may have a suitable partition or protective shield (not shown) positioned therebetween. According to still other embodiments, auxiliary oil tank 106 may be a sub compartment or a chamber within main oil tank 104.

As illustrated, main oil tank 104 and auxiliary oil tank 106 may be fluidly coupled by a tank sharing conduit 110 which extends between and provides fluid communication between main oil tank 104 and auxiliary oil tank 106. According to the illustrated embodiment, tank sharing conduit 110 extends from a bottom 112 of each tank 104, 106. However, it should be appreciated that according to alternative embodiments, tank sharing conduit 110 may be any other fluid pipe or conduit that may transfer oil 102 from auxiliary oil tank 106 to main oil tank 104, or vice versa.

According to an exemplary embodiment, oil supply system 100 includes a tank sharing valve 114 which is fluidly coupled to tank sharing conduit 110 for regulating a flow of shared oil 116 that passes from auxiliary oil tank 106 to main oil tank 104. Specifically, according to the illustrated embodiment, tank sharing valve 114 is configured for pressure response in both main oil tank 104 and auxiliary oil tank 106. Auxiliary oil tank 106 is pressurized by receiving scavenge air/oil mixture via a deaerator (e.g., deaerator device 166 described below). When a main tank pressure within main oil tank 104 is substantially equivalent to an auxiliary oil tank pressure within auxiliary oil tank 106, tank sharing valve 114 is configured for being in the open position to permit the flow of shared oil 116 to be shared between tanks 104, 106. However, a low pressure event in main oil tank 104, which may result for example from a tank puncture or other depressurization, results in tank sharing valve 114 moving to a closed position that prevents the flow of shared oil 116 from flowing through tank sharing conduit 110.

As illustrated, tank sharing valve 114 is a spring-loaded poppet valve that has a relatively large face on the side of auxiliary oil tank 106 and a relatively small face on the side of main oil tank 104. Tank sharing valve 114 includes a spring that maintains the valve head in a normally open position. Although an exemplary tank sharing valve 114 is described herein, it should be appreciated that according to alternative embodiments, tank sharing valve 114 may be any other suitable type of valve, such as a solenoid valve or another suitable pressure controlled valve for preventing the flow of shared oil 116 from exiting auxiliary oil tank 106 and entering main oil tank 104 when main oil tank 104 is experiencing a depressurization event.

As used herein, the term "depressurization event," "pressure loss event," and the like are intended to refer to operating conditions within oil supply system 100 where main oil tank 104 has lost its pressure seal or is otherwise unable to maintain the desired oil system pressure and flow. According to exemplary embodiments, such a depressurization event may refer to situations where main oil tank 104 has been punctured and when isolation of main oil tank 104 is desirable to prevent oil 102 from leaking out of oil supply system 100.

It should be appreciated that according to alternative embodiments, the pressure thresholds that may trigger tank sharing valve 114 may vary while remaining within the scope of the present subject matter. For example, tank sharing valve 114 may be modified to prevent situations where tank sharing valve 114 closes unnecessarily. For example, according to an exemplary embodiment, oil supply system 100 may normally operate at 35 pounds per square inch absolute (psia) in both main oil tank 104 and auxiliary oil tank 106. In one exemplary embodiment, the dangerous pressure loss event may be considered a drop in 10 psia or greater within main oil tank 104 (e.g., the main oil tank pressure drops below 25 psia). In such an embodiment, tank sharing valve 114 may be configured for closing when the pressure difference exceeds 10 psia. Alternatively, tank sharing valve 114 may be configured for closing when a pressure difference between main oil tank 104 and auxiliary oil tank 106 is greater than 0.5 psia, greater than 3 psia, greater than 8 psia, greater than 20 psia, etc. Other thresholds may be used while remaining within the scope of the present subject matter.

Referring still to FIG. 2, oil supply system 100 may include a primary supply conduit 120 which is fluidly coupled to gas turbine engine 10 for providing a flow of primary oil (indicated herein by reference numeral 122) to gas turbine engine 10. In addition, oil supply system 100 may include a supply sharing valve 124 which is fluidly coupled to primary supply conduit 120 and is movable between an open position and a closed position. When supply sharing valve 124 is in the open position, the flow of primary oil 122 may be provided to gas turbine engine 10 from both main oil tank 104 and auxiliary oil tank 106. When supply sharing valve 124 is in the closed position, primary supply conduit 120 is isolated from main oil tank 104.

As used herein, the term "isolated" and the like are intended to refer to situations when a fluid conduit or another fluid system downstream from a fluid supply source is fluidly isolated and is no longer in fluid communication with that fluid supply source. Thus, for example, when supply sharing valve 124 closes to isolate main oil tank 104, primary supply conduit 120 receives the flow of primary oil 122 solely from auxiliary oil tank 106. Such an operating condition is illustrated for example in FIG. 4, and will be described in more detail below. According to an exemplary embodiment, tank sharing valve 114 and supply sharing valve 124 are configured for moving towards the closed position when a depressurization event occurs within main oil tank 104, thereby isolating main oil tank 104 and preventing loss of oil 102. As explained below, isolating main oil tank 104 may help conserve oil 102 for use in lubricating critical portions of a gas turbine engine 102.

According to an exemplary embodiment, supply sharing valve 124 includes in a first inlet 126 which is fluidly coupled to the main oil tank 104 and a second inlet 128 which is fluidly coupled auxiliary oil tank 106. Supply sharing valve 124 may be similar in many respects to tank sharing valve 114, such that closing tank sharing valve prevents the flow of oil 102 from main oil tank 104 through supply sharing valve 124. However, supply sharing valve 124 further includes an outlet 130 which may provide the flow of oil 102 from auxiliary oil tank 106 to primary supply conduit 120 regardless of the position of supply sharing valve 124. Similar to tank sharing valve 114, it should be appreciated that supply sharing valve 124 may vary in type, position, and operation while remaining within the scope of the present subject matter.

Referring still to FIG. 2, oil supply system 100 may include a primary supply pump 132 that is fluidly coupled to primary supply conduit 120 for urging the flow of primary oil 122 through primary supply conduit 120 to gas turbine engine 10. In general, primary supply pump 132 (e.g., as well as other pumps described herein) may be any suitable type or configuration of fluid pump for urging fluid within a supply conduit. For example, primary supply pump 132 may be a rotary pump, a positive displacement pump, a recipro-cating pump, or any other suitable fluid pump for circulating oil 102 with oil supply system 100.

Oil supply system 100 further includes an auxiliary supply conduit 140 which extends between and fluidly couples auxiliary oil tank 106 to gas turbine engine 10. In addition, an auxiliary oil pump 142 may be fluidly coupled to auxiliary supply conduit 140 for providing a flow of auxiliary oil (e.g., indicated herein by reference numeral 144) to gas turbine engine 10. According to exemplary embodiment, auxiliary oil pump 142 may be similar in some or all respects to primary supply pump 132, except that it is mounted to auxiliary supply conduit 140.

Notably, as described in more detail below according to an exemplary embodiment, auxiliary supply conduit 140 is configured for providing oil 102 to a critical portion 150 of gas turbine engine 10. In this regard, for example, oil supply system 100 is configured for ensuring the flow of auxiliary oil 144 is maintained during a variety of harsh operating conditions, regardless of whether or not the flow of primary oil 122 is flowing or whether main oil tank 104 is isolated. Specifically, auxiliary supply conduit 140 and auxiliary supply pump 142 are intended to act as redundant and continuous oil supplies for critical portion 150 of gas turbine engine 10.

As used herein, the term "critical portion" is intended to refer to areas within a gas turbine engine that must maintain a substantially constant supply of oil in order to reduce the chance of quick and severe component degradation or failure. In this regard, mechanical components within gas turbine engine 10 which are subjected to severe, high stress loading may be deemed part of critical portion 150, and may have nozzles or oil supplies directed precisely within those components. By contrast, portions of gas turbine engine 10 which are not within critical portion 150 may be referred to as "non-critical portions." These non-critical portions of gas turbine engine 10 may be able to operate for a longer time (e.g., relative to critical portions 150) without failing. It should be appreciated that according to various embodiments the present subject matter, primary supply conduit 120 and auxiliary supply conduit 140 may be routed in any suitable manner to distribute oil 102 to any suitable components or regions within gas turbine engine 10 as desired for a given application.

One exemplary operating condition where auxiliary oil tank 106 is used to supply critical portion 150 of gas turbine engine 10 is in a negative gravity situation. As used herein, the term "negative gravity" is generally intended to refer to situations where gas turbine engine 10 is in freefall or is upside down such that oil 102 tends to migrate toward a top 152 of auxiliary oil tank 106. For example, if gas turbine engine 10 is mounted on a military helicopter which experiences a sudden loss and lift falls under the force of gravity, oil 102 will have a tendency to collect at top 152 of auxiliary oil tank 106.

Notably, supply ports in both main oil tank 104 and auxiliary oil tank 106 which are coupled to primary supply conduit 120 are at bottoms 112 of tanks 104, 106, such that primary supply pump 132 may such only air in a negative gravity condition. If the supply port from auxiliary oil tank 106 to auxiliary supply conduit 140 is also proximate bottom 112, auxiliary supply pump 142 would only suck air and critical portions 150 of gas turbine engine 10 may fail. Thus, according to the illustrated embodiment, auxiliary supply tank 106 and auxiliary supply conduit 140 are configured for ensuring appropriate flow of auxiliary oil 144 even in negative gravity conditions.

Specifically, auxiliary oil tank 106 may define a vertical midpoint 154 that is positioned at a middle along a vertical direction V between bottom 112 and top 152 of auxiliary oil tank 106. According to the illustrated embodiment, auxiliary supply conduit 140 is fluidly coupled to auxiliary oil tank 106 proximate vertical midpoint 154. In addition, auxiliary oil tank 106 may be filled with oil 102 such that vertical midpoint 154 is always covered with oil 102. In this regard, for example, auxiliary oil tank 106 may define an auxiliary storage volume that remains greater than 50% filled when oil supply system 100 is properly charged or filled with oil 102. According to alternative embodiments, any other suitable fill percentage may be used so long as auxiliary supply conduit 140 is always in fluid contact with oil 102.

Referring still to FIG. 2, oil supply system 100 may further include a recirculation conduit 160 which is fluidly coupled to gas turbine engine 10 and is configured for recirculating used oil, referred to herein as scavenge air/oil mixture or simply scavenge mixture 162 back into auxiliary oil tank 106. Specifically, as illustrated, oil supply system 100 may further include a scavenge oil pump 164 that is fluidly coupled to recirculation conduit 160 for drawing scavenge mixture 162 from gas turbine engine 10 (e.g., through critical portion 150) and passing that scavenge mixture 162 back into auxiliary oil tank 106. Although not illustrated herein for simplicity, it should be appreciated that a variety of oil filter systems, treatment devices, and other components may be positioned on or fluidly coupled to recirculation conduit 160 for treating or filtering scavenge mixture 162 before providing it back into auxiliary oil tank 106.

In addition, as illustrated, oil supply system 100 may include a deaerator device 166 that is operably coupled to recirculation conduit 160 for removing air (e.g. indicated herein by reference numeral 168) from scavenge mixture 162. The deaerator device 166 may pass scavenge mixture 162 back into auxiliary oil tank 106 while extracted air may be passed to an accessory system 170 (e.g., such as an accessory gearbox) of gas turbine engine 10 or an aircraft for secondary use. According to the illustrated embodiment, oil supply system 100 further includes a tank pressurizing valve 172 for regulating the flow of air 168, as described below.

Specifically, tank pressurizing valve 172 is in fluid communication with both main oil tank 104 and auxiliary oil tank 106. Tank pressurizing valve 172 is generally any valve suitable for regulating the flow of air 168 within oil supply system 100 such that a pressure within oil supply system 100 is maintained and scavenge mixture 162 is properly deaerated. According to an exemplary embodiment illustrated in FIG. 4, tank pressurizing valve 172 is configured for discharging a pressurized flow of air 168 through main oil tank 104 when there is a depressurization event within main oil tank 104. By contrast, in the shutdown position shown in FIG. 2, tank pressurizing valve 172 is closed to prevent backflow from accessory system 170.

In general, tank pressurizing valve 172 may be any suitable valve or system of valves for regulating the flow of air 168 within oil supply system 100. For example, according to the illustrated embodiment, tank pressurizing valve 172 is a dual poppet valve positioned within a dual chamber valve housing. In this manner, when a depressurization event occurs within main oil tank 104, tank pressurizing valve 172 may prevent backflow from the accessory system 170, which is typically at a higher pressure than ambient or than a pressure within main oil tank 104 in the event of depressurization.

Various operating scenarios for oil supply system 100 will now be described specifically with reference to FIGS. 3 through 5. In each of these figures, solid lines with arrows are intended to refer to flows of oil and dotted lines with arrows are intended to refer to flows of air. Conduits which have not oil flow lines are intended to be static or not operational in the particular operating mode illustrated, e.g. due to closed control valves or other flow regulation within oil supply system 100.

Referring first to FIG. 3, a normal operating mode of oil supply system 100 will be described. Specifically, as shown in FIG. 3, oil supply system 100 is properly pressurized, there are no punctures within main oil tank 104, and gas turbine engine 10 is a not in a negative gravity condition. In this state, tank sharing valve 114 and supply sharing valve 124 both in the open position. In this manner, oil may be shared between main oil tank 104 and auxiliary oil tank 106, e.g., as illustrated by flow of shared oil 116. In addition, primary supply pump 132 draws flow of primary oil 122 from both main oil tank 104 and auxiliary oil tank 106 and supplies it to a gas turbine engine (e.g., or to critical portions thereof) through primary supply conduit 120. In addition, auxiliary supply pump 142 provides a flow of auxiliary oil 144 to critical portions 150 of gas turbine engine 10. Scavenge oil pump 164 continually recirculates scavenge mixture 162 from gas turbine engine 10 back into oil supply system 100 through auxiliary oil tank 106. In this manner, oil 102 may be circulated throughout oil supply system 100 and to all portions of gas turbine engine 10 to facilitate normal operation.

Referring now to FIG. 4, an emergency or main tank depressurization condition will be described. Specifically, as illustrated, the main oil tank 104 may include a puncture 180, e.g., from an artillery shell or other depressurizing source. When this occurs, both tank sharing valve 114 and supply sharing valve 124 move toward the closed positions to isolate main oil tank 104. Notably, in such a condition, primary supply pump 132 will still supply a portion of the flow of primary oil 122 to gas turbine engine 10, but only from auxiliary oil tank 106. Simultaneously, auxiliary supply pump 142 may supply the flow of auxiliary oil 144 to critical portion 150 of gas turbine engine 10. In addition, tank pressurizing valve 172 may be configured for venting air from deaerator device 166 back through main oil tank 104. In this manner, tank pressurizing valve 172 may isolate accessory system 170 which may be at a higher pressure. According to an exemplary embodiment, this may permit an aircraft to operate for just long enough to land safely or to such that main oil tank 104 may be patched or repaired before the aircraft continues on its way.

Referring now to FIG. 5, a negative gravity condition of oil supply system 100 will be described. As shown, when oil supply system 100 is operating in a negative gravity situation, oil 102 collects toward a top 152 of each of main oil tank 104 and auxiliary oil tank 106. Notably, the supply line extending from main oil tank 104 to first inlet 126 of supply sharing valve 124 and the supply line extending from auxiliary oil tank 106 to second inlet 128 of supply sharing valve 124 will be exposed to air at bottom 112 of the respective tanks 104, 106. Thus, when this occurs, non-critical portions of a gas turbine engine 10 are supplied only with air. However, it is still desirable to ensure critical portions 150 gas turbine engine 10 are supplied with oil 102. Thus, due to the position and configuration of auxiliary supply conduit 140, auxiliary supply pump 142 may still provide the flow of auxiliary oil 144 to critical portions 150 even under negative gravity operating conditions. According to an exemplary embodiment, this may permit an aircraft to operate for just long enough to recover from certain maneuvers such that main oil tank 104 may start to supply oil normally.

Now that the construction and configuration of gas turbine engine 10 and oil supply system 100 have been described according to exemplary embodiments of the present subject matter, an exemplary method 200 for supplying oil to a gas turbine engine will be described according to an exemplary embodiment of the present subject matter. Method 200 can be used to supply oil to gas turbine engine 10 using oil supply system 100, or may be used to provide lubricant to any other machine using any other suitable supply system. Further, it should be appreciated that the exemplary method 200 is discussed herein only to describe exemplary aspects of the present subject matter, and is not intended to be limiting.

Figure 6:
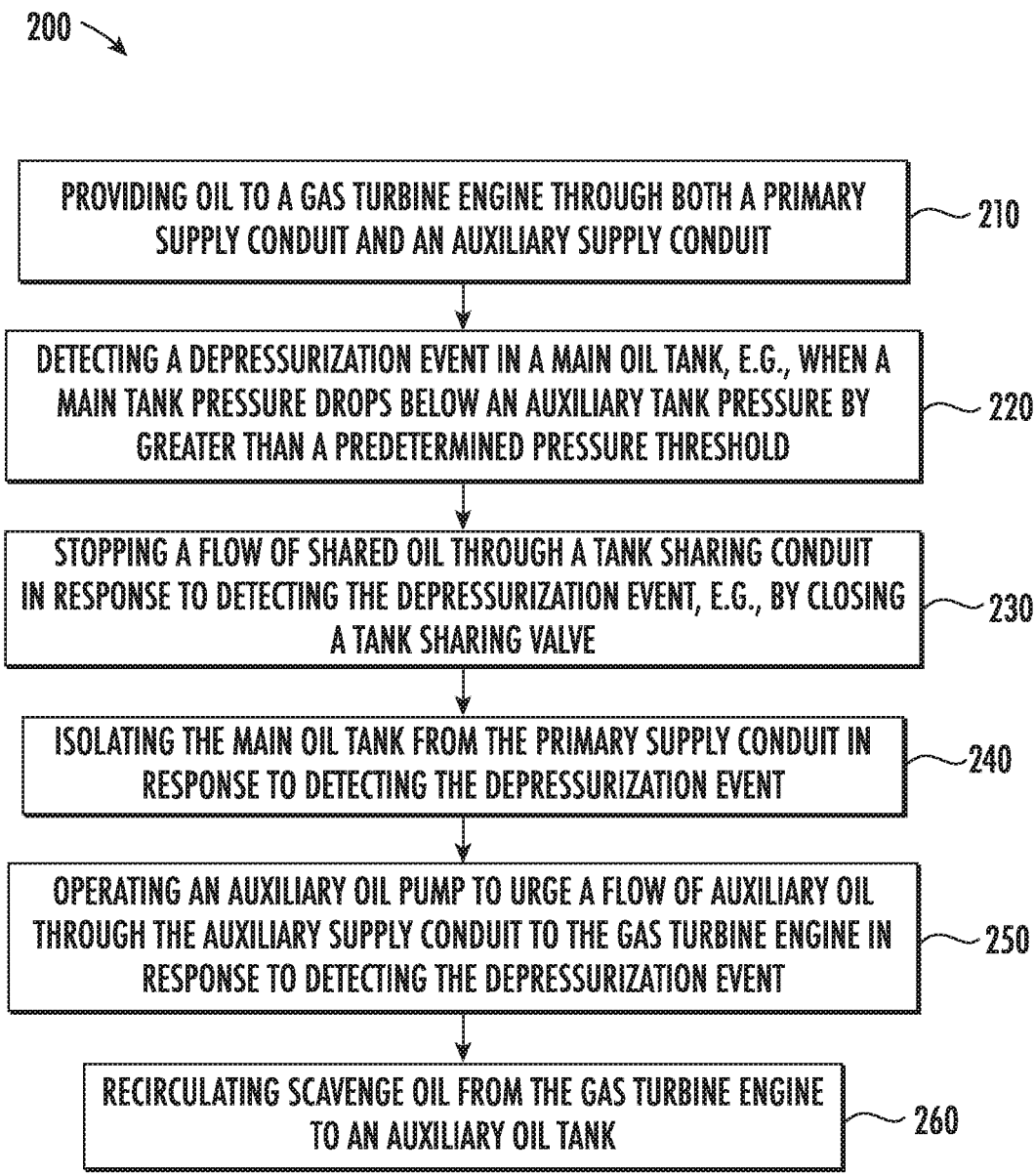
FIG. 6 provides a method of supplying oil to a gas turbine engine according to an exemplary embodiment of the present subject matter.

Referring now to FIG. 6, method 200 includes, at step 210, providing oil to a gas turbine engine through both a primary supply conduit and an auxiliary supply conduit. In this regard, continuing the example from above, the flow of primary oil 122 may be supplied through supply sharing valve 124 from both main oil tank 104 and auxiliary oil tank 106 as well as from auxiliary supply conduit 140 from auxiliary oil tank 106. This operating condition may be referred to herein as the normal operating condition.

Step 220 includes detecting a depressurization event in a main oil tank. For example, the depressurization event may be defined as described above, and may occur when a main tank pressure drops below an auxiliary tank pressure by greater than a predetermined pressure or threshold. When a depressurization event is detected, oil supply system 100 may operate under an emergency mode or a depressurization mode. In this regard, step 230 may include stopping the flow of shared oil 116 through a tank sharing conduit in response to detecting the depressurization event. Continuing the example from above, the flow of shared oil 116 may be stopped by closing tank sharing valve 114.

Step 240 includes isolating the main oil tank from the primary supply conduit in response to detecting the depressurization event. In this regard, for example, supply sharing valve 124 may be closed to prevent oil 102 from main oil tank 104 from passing into primary supply conduit 120. Step 250 may include operating an auxiliary oil pump to urge a flow of auxiliary oil through the auxiliary supply conduit to the gas turbine engine in response to detecting the depressurization event. In this manner, auxiliary supply pump 142 may be used to support the operation of gas turbine engine 10, or more specifically critical portions 150 thereof, during a depressurization event. Step 260 includes recirculating scavenge oil from the gas turbine engine to an auxiliary oil tank, e.g., such that oil supply system 100 may continue circulating oil through gas turbine engine 10.

FIG. 6 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using oil supply system 100 as an example, it should be appreciated that these methods may be applied to any other suitable lubrication system for lubricating any other suitable machine.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An oil supply system for a gas turbine engine, the oil supply system comprising:
    a main oil tank for receiving oil;
    an auxiliary oil tank;
    a tank sharing valve fluidly coupling the main oil tank and the auxiliary oil tank, the tank sharing valve being movable to a closed position to prevent the oil from flowing from the auxiliary oil tank to the main oil tank;
    an auxiliary supply conduit providing fluid communication between the auxiliary oil tank and the gas turbine engine; and
    an auxiliary oil pump fluidly coupled to the auxiliary supply conduit for providing a flow of auxiliary oil to the gas turbine engine,
    wherein the tank sharing valve is a pressure controlled valve that moves to the closed position when a depressurization event occurs in the main oil tank.

2. The oil supply system of claim 1, wherein the depressurization event occurs when a main tank pressure in the main oil tank drops below an auxiliary tank pressure in the auxiliary oil tank.

3. The oil supply system of claim 1, further comprising:
    a primary supply conduit fluidly coupled to the gas turbine engine; and
    a supply sharing valve fluidly coupled to the primary supply conduit, the supply sharing valve being movable between an open position to supply the oil to the primary supply conduit from both the main oil tank and the auxiliary oil tank and a closed position to isolate the primary supply conduit from the main oil tank.

4. The oil supply system of claim 3, wherein the supply sharing valve comprises:
    a first inlet fluidly coupled to the main oil tank;
    a second inlet fluidly coupled to the auxiliary oil tank; and
    an outlet fluidly coupled to the primary supply conduit, wherein the supply sharing valve is movable to a closed position to prevent the oil from flowing from the main oil tank to the primary supply conduit.

5. The oil supply system of claim 3, further comprising:
    a primary supply pump fluidly coupled to the primary supply conduit for urging a flow of primary oil to the gas turbine engine.

6. The oil supply system of claim 3, wherein the supply sharing valve and the tank sharing valve both move to the closed position when a depressurization event occurs in the main oil tank.

7. The oil supply system of claim 3, wherein the auxiliary supply conduit is fluidly coupled to a critical portion of the gas turbine engine and wherein the primary supply conduit is fluidly coupled to a non-critical portion of the gas turbine engine.

8. The oil supply system of claim 1, further comprising:
    a recirculation conduit fluidly coupled to the gas turbine engine; and a scavenge oil pump fluidly coupled to the recirculation conduit for recirculating scavenge oil from the gas turbine engine.

9. The oil supply system of claim 8, wherein the recirculation conduit is fluidly coupled to the auxiliary oil tank for providing the scavenge oil into the auxiliary oil tank.

10. The oil supply system of claim 9, wherein a deaerator device is operably coupled to the recirculation conduit for removing air from the scavenge oil.

11. The oil supply system of claim 1, wherein the auxiliary oil tank defines an auxiliary storage volume that remains greater than 50% filled when the oil supply system is properly filled with the oil.

12. The oil supply system of claim 1, wherein the auxiliary supply conduit is fluidly coupled to the auxiliary oil tank proximate a vertical midpoint of the auxiliary oil tank.

13. An oil supply system for a gas turbine engine, the oil supply system comprising:
    a main oil tank for receiving oil;
    an auxiliary oil tank;
    a tank sharing valve fluidly coupling the main oil tank and the auxiliary oil tank, the tank sharing valve being movable to a closed position to prevent the oil from flowing from the auxiliary oil tank to the main oil tank;
    an auxiliary supply conduit providing fluid communication between the auxiliary oil tank and the gas turbine engine;
    an auxiliary oil pump fluidly coupled to the auxiliary supply conduit for providing a flow of auxiliary oil to the gas turbine engine; and
    a tank pressurizing valve in fluid communication with the main oil tank and the auxiliary oil tank, wherein the tank pressurizing valve regulates a flow of air to an accessory system.

14. The oil supply system of claim 13, wherein the tank pressurizing valve discharges pressurized air from the tank pressurizing valve through the main oil tank when a main tank pressure drops below an auxiliary tank pressure.

15. A method of supplying oil to a gas turbine engine using an oil supply system, the oil supply system comprising a main oil tank and an auxiliary oil tank fluidly coupled by a tank sharing conduit, a primary supply conduit fluidly coupling both the main oil tank and the auxiliary oil tank to the gas turbine engine, and an auxiliary supply conduit fluidly coupling the auxiliary oil tank to the gas turbine engine, the method comprising:
    providing the oil to the gas turbine engine through both the primary supply conduit and the auxiliary supply conduit;
    detecting a depressurization event in the main oil tank;
    stopping a flow of shared oil through the tank sharing conduit in response to detecting the depressurization event;
    isolating the main oil tank from the primary supply conduit in response to detecting the depressurization event; and
    operating an auxiliary oil pump to urge a flow of auxiliary oil through the auxiliary supply conduit to the gas turbine engine in response to detecting the depressurization event.

16. The method of claim 15, wherein the depressurization event occurs when a main tank pressure in the main oil tank drops below an auxiliary tank pressure in the auxiliary oil tank by greater than a predetermined pressure threshold.

17. The method of claim 15, wherein stopping the flow of shared oil through the tank sharing conduit comprises closing a tank sharing valve to prevent the flow of shared oil through the tank sharing conduit.

18. The method of claim 15, wherein the auxiliary supply conduit is fluidly coupled to the auxiliary oil tank proximate a vertical midpoint of the auxiliary oil tank.

19. The method of claim 15, further comprising:
    recirculating scavenge oil from the gas turbine engine to the auxiliary oil tank.

* * * * *